United States Patent [19]

Sindeband et al.

[11] Patent Number: 4,956,824
[45] Date of Patent: Sep. 11, 1990

[54] POSITION DETERMINATION APPARATUS

[75] Inventors: Seymour J. Sindeband, Pound Ridge, N.Y.; Robert Butler, Milford, Conn.

[73] Assignee: Science Accessories Corp., Stratford, Conn.

[21] Appl. No.: 405,944

[22] Filed: Sep. 12, 1989

[51] Int. Cl.$^5$ .............................................. G01S 3/80
[52] U.S. Cl. ...................................... 367/129; 367/907
[58] Field of Search ........................ 367/907, 13, 129; 178/18, 19; 340/710; 364/561

[56] References Cited

U.S. PATENT DOCUMENTS 3,821,469  6/1974  Whetstone et al. .................. 178/18
3,838,212  9/1974  Whetstone et al. .................. 178/18

OTHER PUBLICATIONS

GP-8-3D Operator's Manual—Science Accessories Corporation, Mar. 1985 (106 pages).

Primary Examiner—Thomas H. Tarcza
Assistant Examiner—Daniel T. Pihulic
Attorney, Agent, or Firm—Martin Novack

[57] ABSTRACT

An apparatus is disclosed for determining the position of a moveable element in a three-dimensional workspace near a mounting surface. A sound source is provided in the moveable element. A plurality of at least three housing units are adapted to be secured to said mounting surface in spaced relationship to one another. A sound sensor is mounted on each of the units, and a sound source is mounted on at least some of the units. The positions of the sound sensor and the sound source of said at least some of the units can be adjusted. Means are provided which are responsive to the sound from the sound source of at least one of the units and received at the sound sensor of another of the units, for computing the distance between the sound source of said one of the units and the sound sensor of said another of said units. Also, means which are responsive to the initiation of sound from the sound source of the moveable element and to sound received at the sound sensors of the units, are provided for determining the three-dimensional position of the moveable element. In the preferred embodiment, the plurality of units comprises four units, and each of the units has a sound source mounted thereon. Also in this embodiment, means are provided for determining the distance between the sound source of any one of the units and the sound sensor of any other one of the units as a function of sound emitted by the sound source of said any one of the units and received by the sound sensor of said any other one of the units. Each of the units also includes means for adjusting the position of the sound source and the sound sensor in two substantially orthogonal directions.

23 Claims, 5 Drawing Sheets

POSITION DETERMINATION APPARATUS

BACKGROUND OF THE INVENTION

This invention relates to apparatus for position determination and, more particularly, to an improved apparatus and method for three-dimensional digitizing of the position of one or more moveable elements.

The determination of the location of an element in a three-dimensional space can be achieved using a three-dimensional sonic digitizer. [As used herein, "element" is intended to generically include any object or any region or point on an object.] Typically, a three-dimensional sonic digitizer operates by providing one or more sound sources that are moveable in a three-dimensional space. A plurality of sound sensors (e.g. microphones), which are at known locations, receive sounds that are periodically emitted from the sound sources. By measuring the transit time of the sound traveling from a sound source to the respective sound sensors, the distance from the sound source to each sound sensor can be obtained. The three-dimensional coordinates of the sound source can then be computed using trigonometric relationships.

The U.S. Pat. No. 3,821,469 discloses a three-dimensional digitizer of the type described above. The sound sensors used in said patent are elongated cylindrically-shaped microphones which are positioned along the three orthogonal axes of a coordinate space in which the position of a sound source is to be digitized.

An improvement on the approach of U.S. Pat. No. 3,821,469 utilizes a plurality of at least three, and preferably four, so-called point microphones mounted on a plane surface. [The fourth sensor is useful in case one of the sensors is blocked, and also for providing further information to improve accuracy.] Again, one or more sound sources located in the airspace over the four sound sensors can be digitized, the travel time to the microphones and trigonometric relationships being used to determine the three-dimensional coordinates of a sound source. Equipment of this type is known in the art and is commercially available, for example, as a Model GP-8-3D, sold by Science Accessories Corp. of Stratford, CT.

In order to accurately determine the coordinates of a sound source in the last-described type of system, it is necessary to know, with reasonably high accuracy, the relative positions of the sound sensors. Also, it is helpful to have the sensors in a predetermined regular geometric configuration, preferably a square. There are problems, however, in determining and maintaining the positions of the sound sensors with respect to each other and, for example, in a perfectly square configuration. There are a number of reasons for prior difficulties in accurately locating the sound sensors. Attempts at measuring the distance between sound sensors, such as with a ruler or by manually positioning the moveable sound sources, tend to be inaccurate due to human limitations in making the measurements. Also, the physically measured distance between, say, the outer accessible surfaces of point microphones, will not necessarily provide an accurate measure of the correct distance between these sound sensors. The desire to position the sound sensors in a near-perfect square causes further difficulty in properly and efficiently positioning all four of the sound sensors.

It is among the objects of the present invention to provide solution to difficulties of the prior art with regard to positioning of the sound sensors of a three-dimensional digitizer apparatus. It is also among the objects of the present invention to provide an improved adjustable housing unit for sound sensors of a three-dimensional digitizer apparatus.

SUMMARY OF THE INVENTION

A form of the present invention is directed to an apparatus for determining the position of a moveable element in a three-dimensional workspace near a mounting surface. A sound source is provided in the moveable element. A plurality of at least three housing units are adapted to be secured to said mounting surface in spaced relationship to one another. A sound sensor is mounted on each of the units, and a sound source is mounted on at least some of the units. Means are provided for adjusting the positions of the sound sensor and the sound source of said at least some of the units. Means are provided which are responsive to the sound from the sound source of at least one of the units and received at the sound sensor of another of the units, for computing the distance between the sound source of said one of the units and the sound sensor of said another of said units. Also, means which are responsive to the initiation of sound form the sound source of the moveable element and to sound received at the sound sensors of the units, are provided for determining the three-dimensional position of the moveable element.

In the preferred embodiment of the invention, the plurality of units comprises four units, and each of the units has a sound source mounted thereon. Also in this embodiment, means are provided for determining the distance between the sound source of any one of the units and the sound sensor of any other one of the units as a function of sound emitted by the sound source of said any one of the units and received by the sound sensor of said any other one of the units.

In the preferred embodiment of a form of the invention, each of the units includes means for adjusting the position of the sound source and the sound sensor in two substantially orthogonal directions. The illustrated embodiment has adjustable means which comprise a first base member having a groove therein in one direction. A second base member is adjustable to move in the groove of said first base member, the second base member having a groove in a direction substantially orthogonal to the direction of the grove in the first base member. An enclosure engages the groove of the second base member and is adjustable to move in the groove of second base member. The sound sensor and the sound source of the unit are mounted in the enclosure. The enclosure includes a panel which is at an angle with respect to the vertical, and the sound source and the sound sensor are mounted to transmit and receive, respectively, from the panel.

Further features and advantages of the invention will become more readily apparent from the following detailed description when taken in conjunction with the accompanying drawings.

DESCRIPTION OF THE PREFERRED EMBODIMENTS

Figure 1:
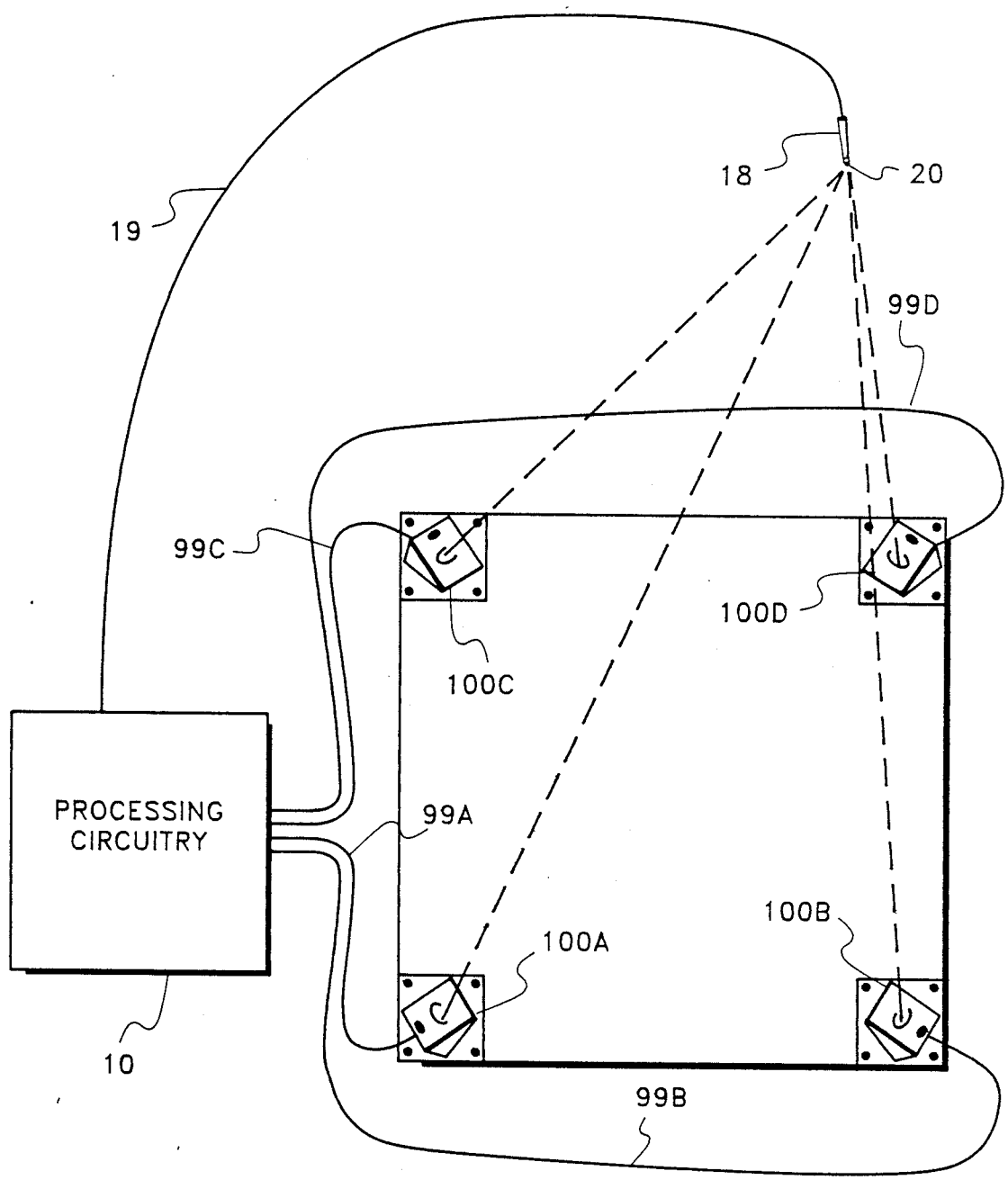
FIG. 1 is a diagram, partially in block form, of an apparatus in accordance with the invention and which can be used to practice an embodiment of the method of the invention.
Figure 2:
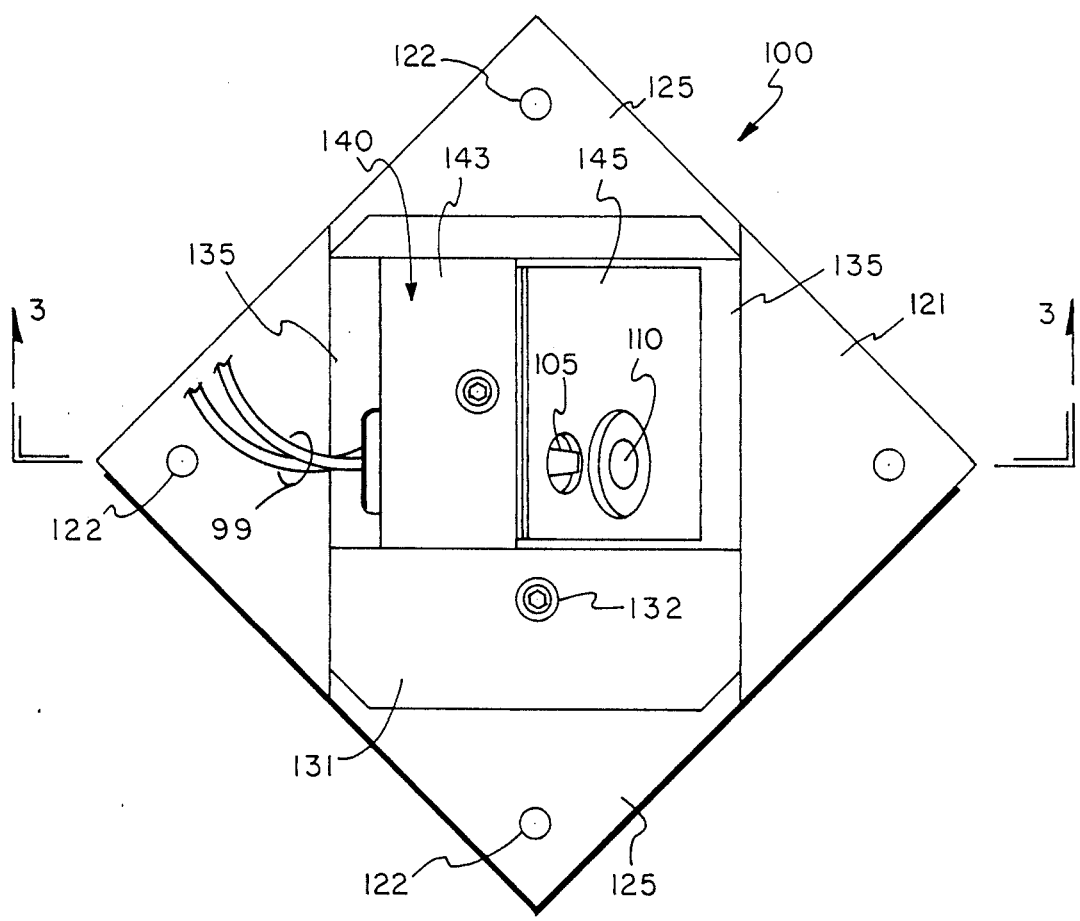
FIG. 2 is a top view of a mounting unit in accordance with an embodiment of the invention, and which can be used in practicing an embodiment of the method of the invention.
Figure 3:
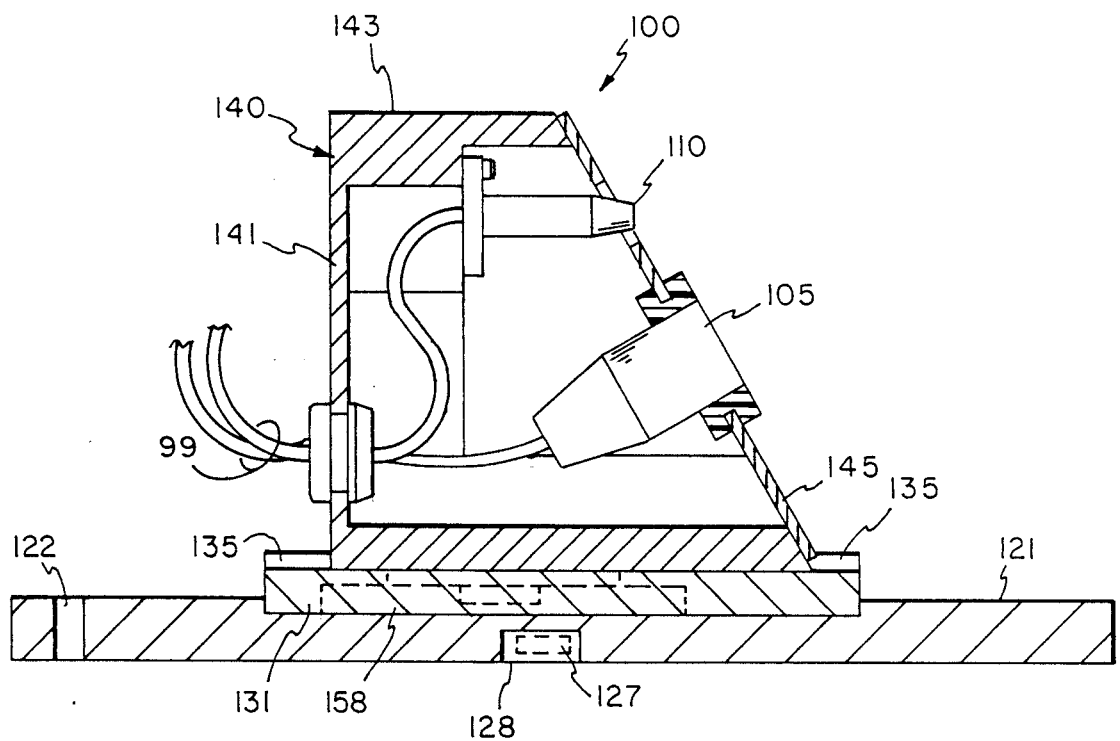
FIG. 3 is a cross-sectional view of the mounting unit of FIG. 2 as taken through the section 3—3 of FIG. 2.
Figure 4:
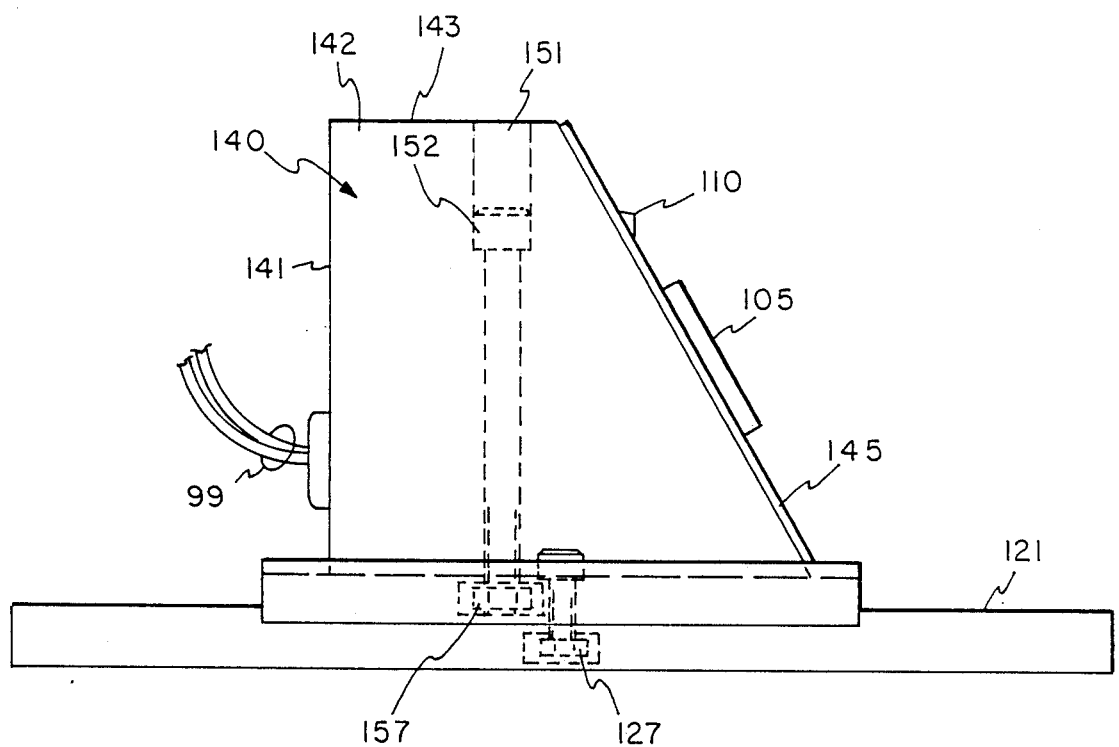
FIG. 4 is a side view of the mounting unit of FIG. 2.

Referring to FIG. 1, there is shown an apparatus in accordance with an embodiment of the invention. A plurality of at least three housing units are provided, four such units 100A, 100B, 100C and 100D being utilized in the present embodiment. The four housing units are initially mounted in an approximately square configuration on a flat mounting surface 5. In the illustrated embodiment, each of the housing units is identical and has a wedge-shaped configuration, as is further illustrated in FIGS. 2-4. Each unit 100 has a sound sensor 105 and sound source 110. In the present embodiment, the sensor 105 and the source 110 point toward the center of the square configuration of units. The sound sensor 105 may be, for example, a so-called point microphone type of sensor, and the sound source 110 may be, for example, a spark gap type of sonic generator or a piezoelectric transducer. One or more moveable sound sources, such as sound source 20 in FIG. 1, are movable in the region generally above the units 100; i.e., the volume of air space over the periphery defined by the sound sensors of the four units 100 and, to some extent, the region surrounding said air space. In the illustrated embodiment, the movable sound source is at the tip of a stylus or holder 18 which is coupled, via a cable 19, to electronic processing circuitry represented by the block 10. The units 100 are also coupled to the circuitry 10 via respective cables 99A, 99B, 99C and 99D. The circuitry 10 includes a microprocessor subsystem that is conventionally provided with associated memory, timing and clock circuitry, input/output capability and analog-to-digital and digital-to-analog capability (none of which are separately shown). The microprocessor subsystem 50 my be implemented, for example, using a personal computer, such as an IBM PS2 with associated peripherals or any other suitable general or special purpose processor and associated circuitry. As is well known in the art, distance measurement between a sound source and a sound sensor can be obtained by starting a clock upon transmission of the sound energy from the source and stopping the clock upon receipt of the sound energy at the sound sensor. The circuitry for pulsing of sound sources and the circuitry for detecting the onset of received sound energy can be implemented with individual circuits or be multiplexed. Temperature compensation circuitry can be utilized to correct for differences in the speed of sound in air at different air temperatures. Also in its conventional operating mode, the digitizer can determine the three-dimensional coordinates of the movable sound source 110 by determining the distance between the sound source and each of at least three of the sound sensors and then computing the position using known geometrical relationships. As these principles and circuits are known in the art and not, of themselves, part of the improvement of the present invention, reference can be made to the available literature for further description.

Referring to FIGS. 2-5, there is shown an embodiment of the adjustable housing unit 100 in accordance with an embodiment of the invention. A lower base member 121, which has a square periphery in this embodiment, has holes 122 at its corners for receiving screws (not shown) that secure the unit 100 to a mounting surface, such a surface 5 in FIG. 1. The lower base member 121 has a wide groove 125 extending diagonally across its top surface. An upper base member 131, which also has a square periphery in this embodiment, has a side dimension that fits the groove 125 s that the upper base member can slide in the groove. A set screw 132 in the upper base member 131 engages a nut 127 that slides in (but cannot rotate in) a narrow groove 128 in the bottom surface of the lower base member 121, the groove 128 being parallel to the groove 125. The set screw 132 can be loosened to permit the upper base member 131 to slide in the groove 125, and tightened when the upper base member has been moved to the desired position.

The upper base member 131 also has a wide groove, 135, extending across its top surface in a direction that is perpendicular to the direction of groove 125. An enclosure 140 has a width dimension that fits the groove 135 so that the enclosure 140 can slide in the groove 135. The enclosure 140 has a wedge-shape configuration, with a vertical rear panel 141, vertical side panels 142, a horizontal top 143, and a front panel 145 that is at an angle with respect to the vertical. In the present embodiment the front panel 145 is removable, and is held in place by four corner screws (not shown). The enclosure top 143 has a recess 151 which receives an elongated set screw 152 which engages a nut 157 that slides (but cannot rotate in) a groove 158 in the bottom surface of the upper base member 131. The groove 158 is parallel to the groove 135. The set screw 132 can be loosened to permit the enclosure 140 to slide in the groove 135, and tightened when the enclosure has been moved to the desired position. The sound source 110 and the sound sensor 105 are mounted in the enclosure in the manner illustrated in FIGS. 2-4, and transmit and receive, respectively, from the front panel 145. The sound source 110 is mounted, as shown, from a bracket which is secured to the top of the enclosure, and emits through an aperture in front panel 145. The sound sensor 105 is mounted in a grommet in the front panel 145. The cables 99 exit the rear panel 141 through a grommet.

Figure 5:
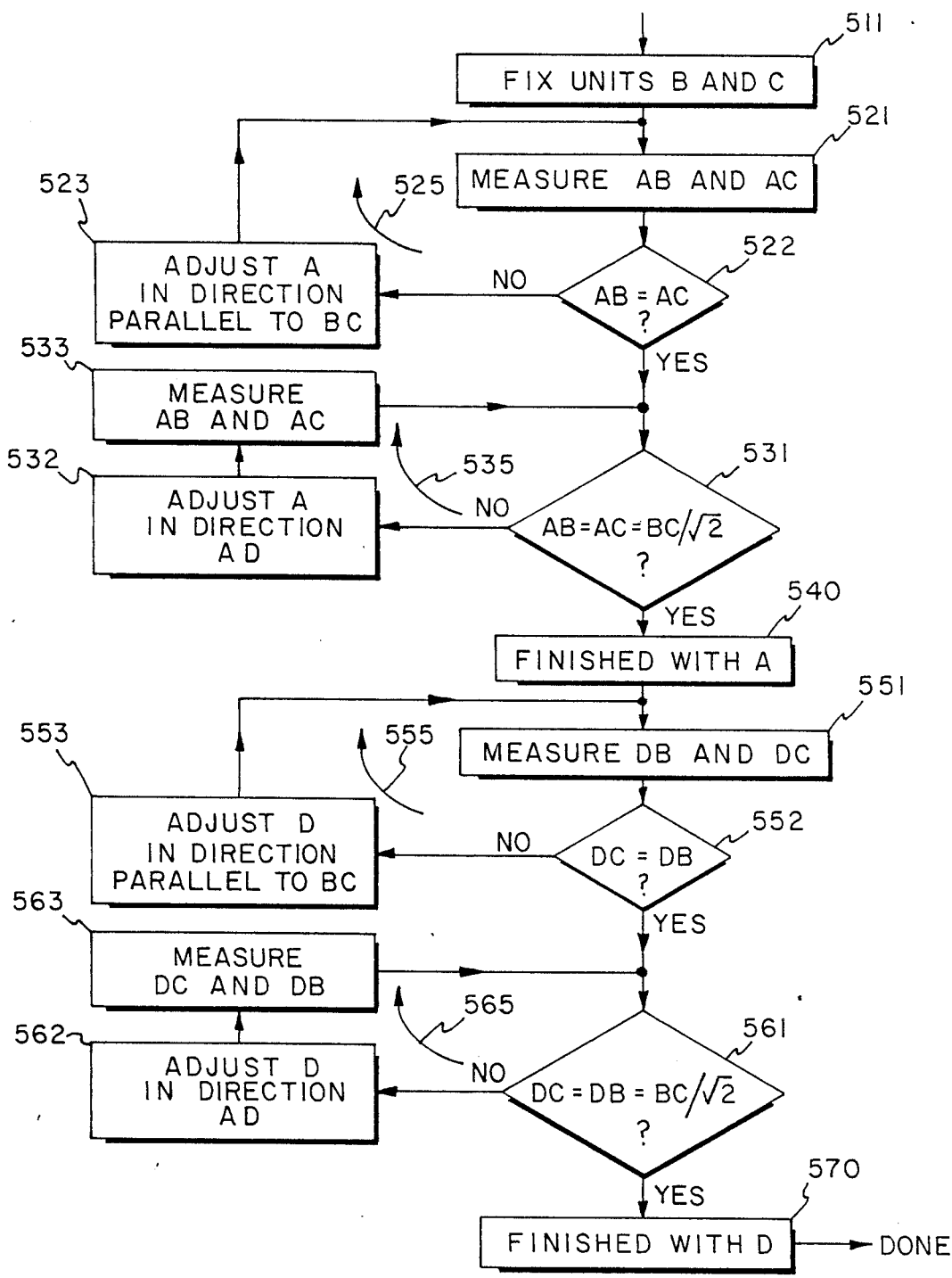
FIG. 5 is a flow diagram of the calibration routine in accordance with an embodiment of the invention.

The sound sources in the housing units allow each unit to communicate with the other units during the calibration procedure. As previously described, the sound emitter and sensor of each unit can be adjusted along two orthogonal axes of movement. With the flexibility afforded by the convenient orthogonal position adjustment of each unit, and the ability to conveniently and accurately measure distance between the units 100, there are various ways in which a squaring calibration procedure can be implemented. One example is described in conjunction with the routine of FIG. 5. In the diagram of FIG. 1, assume that units C and B will remain fixed during the procedure. [The numeral designation 100 for the units is omitted here for clarity.] This is represented by the block 511. The position of A is then adjusted, in an adjustment direction that is approximately parallel to the BC direction, until AB substantially equals AC. This is represented in FIG. 5 by the block 521, the decision diamond 522, the block 523, and the loop 525. When AB substantially equals AC, A is further adjusted (this time in the direction orthogonal to its previous adjustment, i.e. in the direction of AD) until AB and AC equal BC divided by the square route of 2.

This is the desired relationship between the hypotenuse and the legs of an isosceles right triangle. These steps are represented in FIG. 5 by the diamond 531, blocks 532 and 555, and the loop 535. The adjustment of A is then finished (block 540) and A can be fixed. The procedure just followed for unit A is then repeated for unit D. This procedure is illustrated in FIG. 5 by block 551, decision diamond 552, and block 553 (loop 555), and by decision diamond 561 and blocks 562 and 563 (loop 565). When the condition of diamond 561 is met, the adjustment of unit D is finished (block 570), and the units have been positionally calibrated in a suitable square arrangement for operation. The accurate leg distances can be utilized in the digitization computations.

The invention has been described with reference particular preferred embodiments, but variations within the spirit and scope of the invention will occur to those skilled in the art. For example, while it is convenient from a standpoint of uniformity and interchangeability to have a sound source on each mounting unit, it will be understood that the invention can be practiced with sound sources on less than all units. Also, while arrangement of the units on a flat surface and in a regular pattern can be advantageous, the mounting arrangement can be on other surfaces and in other arrangements, as long as locations are known or can be determined. Further, it will be recognized that, if desired, more than four units can be utilized for a given application. The invention also has application in a system which reverses the mode of operation by transmitting from at least three known locations and receiving at a moveable sound sensor. In such case, in FIG. 1, for example, moveable element 20 would be a sound sensor and it would receive sound emitted sequentially from the sound sources 105 of units 100, with distances again being computed from sound transit times. The advantages of having both a sound source and a sound sensor on at least some units, for distance measurement between units, will be apparent as well for this case. Finally, it will be recognized that communication between the units 100 can also be used for pilot purposes e.g. in determining the temperature, composition, stability, or other properties of the transmission medium (air) and compensating therefor, as appropriate.

We claim:

1. Apparatus for determining the position of a moveable element in a three-dimensional workspace near a mounting surface, comprising:
    a sound source in said moveable element;
    a plurality of at least three housing units adapted to be secured to said mounting surface in spaced relationship to one another;
    a sound sensor mounted on each of said units;
    a sound source mounted on at least some of said units;
    means for adjusting the positions of the sound sensor and the sound source of said at least some of said units;
    means responsive to the sound from the sound source of at least one of said units and received at the sound sensor of another of said units, for computing the distance between the sound source of said one of said units and the sound sensor of said another of said units; and
    means responsive to the initiation of sound from the sound source of the moveable element and to sound received at the sound sensors of said units, for determining the three-dimensional position of the moveable element.

2. Apparatus as defined by claim 1, wherein said plurality of units comprises four units.

3. Apparatus as defined by claim 2, wherein the units which have a sound source include means for adjusting the position of the sound source and the sound sensor in two substantially orthogonal directions.

4. Apparatus as defined by claim 2, wherein each of said units has a sound source mounted thereon.

5. Apparatus as defined by claim 4, wherein means are provided for determining the distance between the sound source of any one of said units and the sound sensor of any other one of said units as a function of sound emitted by the sound source of said any one of the units and received by the sound sensor of said any other one of the units.

6. Apparatus as defined by claim 4, wherein each of said units includes means for adjusting the position of the sound source and the sound sensor in two substantially orthogonal directions.

7. Apparatus as defined by claim 6, wherein said adjustable means comprises a first base member having a groove therein in one direction; a second base member which is adjustable to move in the groove of said first base member, said second base member have a groove in a direction substantially orthogonal to the direction of the groove in the first base member; and an enclosure which engages the groove of said second base member and is adjustable to move in the groove of said second base member, the sound sensor and the sound source of the unit being mounted in said enclosure.

8. Apparatus as defined by claim 7, wherein said enclosure includes a panel which is at an angle with respect to the vertical, and wherein said sound source and said sound sensor are mounted to transmit and receive, respectively, from said panel.

9. Apparatus as defined by claim 1, wherein the units which have a sound source include means for adjusting the position of the sound source and the sound sensor in two substantially orthogonal directions.

10. Apparatus as defined by claim 9, wherein said adjustable means comprises a first base member having a groove therein in one direction; a second base member which is adjustable to move in the groove of said first base member, said second base member have a groove in a direction substantially orthogonal to the direction of the groove in the first base member; and an enclosure which engages the groove of said second base member and is adjustable to move in the groove of said second base member, the sound sensor and the sound source of the unit being mounted in said enclosure.

11. Apparatus as defined by claim 10, wherein said enclosure includes a panel which is at an angle with respect to the vertical, and wherein said sound source and said sound sensor are mounted to transmit and receive, respectively, from said panel.

12. Apparatus as defined by claim 11, wherein said sound sensor is mounted in the surface of said panel so that its central axis is in a direction that is orthogonal to the plane of said panel.

13. Apparatus as defined by claim 1, wherein each of said units has a sound source mounted thereon.

14. Apparatus as defined by claim 13, wherein means are provided for determining the distance between the sound source of any one of said units and the sound sensor of any other one of said units as a function of sound emitted by the sound source of said any one of the units and received by the sound sensor of said any other one of the units.

15. For use in a three-dimensional acoustic digitizer apparatus having at least three units which respectively contain sound sensors for sensing the arrival of sound from a moveable sound source that is moveable in a three-dimensional space, and means responsive to the time of emission of sound from said moveable sound source and to the sensing of sound by the sound sensors for determining the three-dimensional position of the moveable sound source, at least one of said units being characterized by:
   a sound source mounted in said unit in conjunction with said sound sensor; and
   means for adjusting the position of the sound source and the sound sensor in two substantially orthogonal directions.

16. The unit as defined by claim 15, wherein said unit has a flat mounting base, and said sound sensor and said sound source are aligned along a direction that is substantially orthogonal to said mounting base.

17. The unit as defined by claim 16, further comprising:
   a first base member having a groove therein in one direction;
   a second base member which is adjustable to move in the groove of said first base member, said second base member have a groove in a direction substantially orthogonal to the direction of the groove in the first base member; and
   an enclosure which engages the groove of said second base member and is adjustable to move in the groove of said second base member, the sound sensor and the sound source of the unit being mounted in said enclosure.

18. The unit as defined by claim 17, wherein said enclosure includes a panel which is at an angle with respect to the vertical, and wherein said sound source and said sound sensor are mounted to transmit and receive, respectively, from said panel.

19. The unit as defined by claim 1B, wherein said sound sensor is mounted in the surface of said panel so that its central axis is in a direction that is orthogonal to the plane of said panel.

20. For use in conjunction with a three-dimensional position-determining apparatus which includes: a moveable sound source; a plurality of at least three sound sensors mounted on a plane surface in spaced-apart positions; and means responsive to the initiation of sound from the moveable sound source, and to sound received at said sound sensors, for determining the three-dimensional position of the moveable sound source; a method for adjusting the positions of the sound sensors and measuring the distances therebetween, comprising the steps of:
   for at least some of said sound sensors, providing a further sound source that is mounted in fixed relationship with its associated sound sensor;
   measuring the distance between selected ones of said sound sensors by using said further sound sources in substitution for said movable sound source;
   adjusting the positions of at least some of said sound sources and their associated sound sensors; and
   again measuring the distance between at least some of said sound sensors;
   whereby the distances between said sound sensors is used in subsequently determining the three-dimensional position of said movable sound source 21. The method as defined by claim 20, wherein said plurality at at least three sound sensors comprises four sound sensors.

22. The method as defined by claim 20, wherein said step of providing at least some of said sound sensors with a further sound source comprises providing all of said sound sensors with respective further sound sources.

23. The method as defined by claim 22, wherein said plurality at at least three sound sensor comprises four sound sensors.

* * * * *